(12) United States Patent
Zhang

(10) Patent No.: US 12,278,858 B2
(45) Date of Patent: Apr. 15, 2025

(54) METHOD AND APPARATUS FOR DATA PROCESSING BASED ON A CLOUD DOCUMENT COMPONENT

(71) Applicant: Beijing Zitiao Network Technology Co., Ltd., Beijing (CN)

(72) Inventor: Zhengzhe Zhang, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/745,873

(22) Filed: Jun. 17, 2024

(65) Prior Publication Data

US 2024/0340335 A1 Oct. 10, 2024

Related U.S. Application Data

(63) Continuation of application No. PCT/CN2022/138516, filed on Dec. 13, 2022.

(30) Foreign Application Priority Data

Dec. 17, 2021 (CN) .......................... 202111554270.3

(51) Int. Cl.
*H04L 67/06* (2022.01)
*G06F 16/93* (2019.01)
(Continued)

(52) U.S. Cl.
CPC .............. *H04L 67/06* (2013.01); *G06F 16/93* (2019.01); *H04L 63/083* (2013.01); *H04L 67/02* (2013.01)

(58) Field of Classification Search
None
See application file for complete search history.

(56) References Cited

U.S. PATENT DOCUMENTS

2012/0134494 A1* 5/2012 Liu .................... H04L 9/0894
726/26
2013/0054684 A1* 2/2013 Brazier ............... H04M 3/5231
709/203
(Continued)

FOREIGN PATENT DOCUMENTS

CN 106549907 A 3/2017
CN 107888680 A * 4/2018
(Continued)

OTHER PUBLICATIONS

International Search Report for PCT Patent Application No. PCT/CN2022/138516, mailed Jan. 28, 2023, 3 pages.
(Continued)

*Primary Examiner* — Lashonda Jacobs-Burton
(74) *Attorney, Agent, or Firm* — Astute IP Law Group

(57) ABSTRACT

The application discloses a method of data processing based on a cloud document component, which can be executed by the first client. The first client may send an access token to the cloud document component, to cause the cloud document component to perform authentication on the first client. After the cloud document component receives the access token, authentication can be performed on the first client with the access token. After the cloud document component confirms that the first client has passed the authentication, the first client can load a cloud document in the first client with the cloud document component in response to the cloud document component determining that the first client has passed the authentication. The cloud document component can load the cloud document with a first component provided by the first client, and the first component can provide a capability of rendering a web page.

18 Claims, 3 Drawing Sheets

(51) Int. Cl.
*H04L 9/40* (2022.01)
*H04L 67/02* (2022.01)

(56) References Cited

U.S. PATENT DOCUMENTS

| | | | | |
|---|---|---|---|---|
| 2014/0164315 | A1* | 6/2014 | Golshan | G06F 16/93 |
| | | | | 707/608 |
| 2015/0381784 | A1* | 12/2015 | Wun | H04B 1/3888 |
| | | | | 455/575.1 |
| 2016/0034435 | A1* | 2/2016 | Patidar | G06F 40/166 |
| | | | | 715/255 |
| 2016/0127452 | A1 | 5/2016 | Newman et al. | |
| 2017/0063836 | A1* | 3/2017 | Cui | H04L 63/0884 |
| 2017/0099344 | A1* | 4/2017 | Hadfield | H04L 63/20 |
| 2020/0142863 | A1* | 5/2020 | Kaplan | G06F 16/1824 |
| 2020/0358615 | A1* | 11/2020 | Smolny | H04L 9/3234 |

FOREIGN PATENT DOCUMENTS

| | | | |
|---|---|---|---|
| CN | 108616499 | A | 10/2018 |
| CN | 108762946 | A | 11/2018 |
| CN | 111314454 | A | 6/2020 |
| CN | 111625854 | A | 9/2020 |
| CN | 111814440 | A | 10/2020 |
| CN | 112580006 | A | 3/2021 |
| CN | 112654973 | A | 4/2021 |
| CN | 112765648 | A | 5/2021 |
| CN | 112866385 | A | 5/2021 |
| CN | 114257441 | A | 3/2022 |
| CN | 114666076 | A * | 6/2022 |
| WO | 2020070308 | A1 | 4/2020 |

OTHER PUBLICATIONS

Office Action for Chinese Patent Application No. 2022111554270.3, mailed Jun. 14, 2023, 10 pages.

* cited by examiner

METHOD AND APPARATUS FOR DATA PROCESSING BASED ON A CLOUD DOCUMENT COMPONENT

CROSS-REFERENCE TO RELATED APPLICATIONS

This application is a continuation of International Patent Application No. PCT/CN2022/138516, filed on Dec. 13, 2022, which claims the benefit of CN Patent Application No. 202111554270.3 filed on Dec. 17, 2021, both of which are incorporated herein by reference in their entireties.

FIELD

This application relates to the field of data processing, and in particular to a method and apparatus for data processing based on a cloud document component.

BACKGROUND

Cloud documents can be edited collaboratively by a plurality of users, thus effectively promoting information sharing. Currently, cloud document components can open up the cloud document in the form of components, enabling system developers to develop applications at the web level, thus implementing cloud document-based products in the browser.

Currently, the cloud document component can only be implemented at the browser, and lacks the technical implementation means to implement it to other scenarios.

SUMMARY

The technical problem to be solved by this application is that the cloud document component cannot be applied in scenarios other than browsers, and a method and apparatus for data processing based on a cloud document component are provided.

In a first aspect, embodiments of the present application provide a method of data processing based on a cloud document component, wherein the method is implemented at a first client and comprises:
  sending an access token to the cloud document component, to cause the cloud document component to perform authentication on the first client; and
  in response to the cloud document component determining that the first client has passed the authentication, loading a cloud document in the first client with the cloud document component, wherein the cloud document component loads the cloud document with a first component provided by the first client, the first component providing a capability of rendering a web page.

Optionally, the method further comprises:
  sending, by the first client and to the cloud document component, customized configuration information for customizing a function of the cloud document.

Optionally, the method further comprises:
  obtaining, by the first client, event data returned by a second client through an interface provided by the cloud document component to the first client, wherein the cloud document component invokes an interface on the second client through an interface with a cross-domain communication capability and provided by the first client, thereby acquiring the event data returned by the second client.

Optionally, obtaining, by the first client, event data returned by a second client through an interface provided by the cloud document component to the first client comprises:
  obtaining, by the first client, the event data through a callback function and an interface provided by the cloud document component to the first client.

In a second aspect, embodiments of the present application provide a method of data processing based on a cloud document component, wherein the method comprises:
  receiving, by the cloud document component, an access token sent by a first client;
  performing, by the cloud document component, authentication on the first client with the access token; and
  after determining that the first client has passed the authentication, loading, by the cloud document component, a cloud document with a first component provided by the first client, the first component providing a capability of rendering a web page.

Optionally, the method further comprises:
  receiving, by the cloud document component, customized configuration information sent by the first client, the customized configuration information customizing a function of the cloud document.

Optionally, the method further comprises:
  receiving, by the cloud document component, a handshake message sent by a second client, and sending a response message to the second client for the handshake message; and
  sending, by the cloud document component, the access token to the second client.

Optionally, in response to receiving, by the cloud document component, customized configuration information sent by the first client, the method further comprises:
  sending, by the cloud document component, the customized configuration information to the second client.

Optionally, the method further comprises:
  invoking, by the cloud document component, an interface on the second client through an interface with a cross-domain communication capability and provided by the first client, thereby acquiring the event data returned by the second client;
  sending, by the cloud document component, the event data returned by the second client to the first client through an interface provided by the cloud document component to the first client.

Optionally, sending, by the cloud document component, the event data returned by the second client to the first client through an interface provided by the cloud document component to the first client comprises:
  sending, by the cloud document component, the event data returned by the cloud document to the first client through a callback function of the first client for monitoring events and the interface provided by the cloud document component to the first client.

In a third aspect, embodiments of the present application provide a method of data processing based on a cloud document component, wherein the method comprises:
  obtaining by the second client a cloud document web page, in response to a request by the cloud document component to load a cloud document with a first component provided by an applet application; and
  sending, by the second client, the cloud document web page to the cloud document component.

Optionally, the method further comprises:
  sending, by the second client, a handshake message to the cloud document component; and receiving, by the second client, a response message sent by the cloud document component for the handshake message.

Optionally, the method further comprises:

receiving, by the second client, an access token and customized configuration information sent by the cloud document component, the access token causing the cloud document component to perform authentication on the applet application, the customized configuration information customizing a function of the cloud document.

Optionally, obtaining a cloud document web page comprises:

sending, by the second client, a hypertext transfer protocol (HTTP) request carrying the access token and/or the customized configuration information to obtain the cloud document web page.

Optionally, the method further comprises:

registering, by the second client, an interface to be invoked by the cloud document component.

Optionally, the method further comprises:

in response to a monitored event being triggered, sending, by the second client, event data to the cloud document component through an interface on the second client and an interface provided by the applet application.

In a fourth aspect, embodiments of the present application provide an apparatus for data processing based on a cloud document component, wherein the apparatus is implemented at a first client and comprises:

a first sending unit configured to send an access token to the cloud document component, to cause the cloud document component to perform authentication on the first client; and a loading unit configured to, in response to the cloud document component determining that the first client has passed the authentication, load a cloud document in the first client with the cloud document component, wherein the cloud document component loads the cloud document with a first component provided by the first client, the first component providing a capability of rendering a web page.

Optionally, the apparatus further comprises:

a second sending unit configured to send customized configuration information, for customizing a function of the cloud document, to the cloud document component.

Optionally, the apparatus further comprises:

an obtaining unit configured to obtain event data returned by a second client through an interface provided by the c loud document component to the first client, wherein the cloud document component invokes an interface on the second client through an interface with a cross-domain communication capability and provided by the first client, thereby acquiring the event data returned by the second client.

Optionally, the obtaining unit is configured to:

obtain the event data through a callback function and an interface provided by the cloud document component to the first client.

In a fifth aspect, embodiments of the present application provide an apparatus for data processing based on a cloud document component, wherein the apparatus implemented at a cloud document component and comprises:

a first receiving unit configured to receive an access token sent by a first client;

an authentication unit configured to perform authentication on the first client with the access token; and a loading unit configured to, after determining that the first client has passed the authentication, load a cloud document with a first component provided by the first client, the first component providing a capability of rendering a web page.

Optionally, the apparatus further comprises:

a second receiving unit configured to receive customized configuration information sent by the first client, the customized configuration information customizing a function of the cloud document.

Optionally, the apparatus further comprises:

a third receiving unit configured to receive a handshake message sent by a second client, and sending a response message to the second client for the handshake message;

a first sending unit configured to send the access token to the second client.

Optionally, in response to receiving, by the cloud document component, customized configuration information sent by the first client, the method further comprises:

a second sending unit configured to send the customized configuration information to the second client.

Optionally, the apparatus further comprises:

an invoking unit configured to invoke an interface on the second client through an interface with a cross-domain communication capability and provided by the first client, thereby acquiring the event data returned by the second client;

a third sending unit configured to send the event data returned by the second client to the first client through an interface provided by the cloud document component to the first client.

Optionally, the third sending unit is configured to:

send the event data returned by the cloud document to the first client through a callback function of the first client for monitoring events and the interface provided by the cloud document component to the first client.

In a sixth aspect, embodiments of the present application provide an apparatus for data processing based on a cloud document component, wherein the apparatus is implemented at a second client and comprises:

an obtaining unit configured to obtain a cloud document web page, in response to a request by the cloud document component to load a cloud document with a first component provided by an applet application; and a first sending unit configured to send the cloud document web page to the cloud document component.

Optionally, the apparatus further comprises:

a second sending unit configured to sending a handshake message to the cloud document component;

a first receiving unit is configured to receive a response message sent by the cloud document component for the handshake message.

Optionally, the apparatus further comprises:

a second receiving unit configured to receive an access token and customized configuration information sent by the cloud document component, the access token causing the cloud document component to perform authentication on the applet application, the customized configuration information customizing a function of the cloud document.

Optionally, the obtaining unit is configured to:

in response to a request by the cloud document component to load a cloud document with a first component provided by an applet application, send a hypertext transfer protocol (HTTP) request carrying the access token and/or the customized configuration information to obtain the cloud document web page.

Optionally, the apparatus further comprises:
a registration unit configured to register an interface to be invoked by the cloud document component.

Optionally, the apparatus further comprises:
a third sending unit configured to, in response to a monitored event being triggered, send event data to the cloud document component through an interface on the second client and an interface provided by the applet application.

In a seventh aspect, embodiments of the present application provide a device, wherein the device comprises a processor and a memory; and
the processor is configured to execute instructions stored in the memory to cause the device to perform the method according to any of the above first aspects or any of the above second aspects or any of the above third aspects.

In an eighth aspect, embodiments of the present application provide a computer-readable storage medium, comprising instructions which instruct a device to perform the method according to any of the above first aspect or any of the above second aspect or any of the above third aspect.

In a ninth aspect, embodiments of the present application provide a computer program product, wherein the computer program product, when executed on a computer, cause the computer to perform the method according to any of the above first aspect or any of the above second aspect or the above third aspect.

Compared with the existing technology, embodiments of the present application have the following advantages.

Embodiments of the present application provide a method of data processing based on a cloud document component. In one example, the method can be executed by the first client. In one example, the first client may send an access token to the cloud document component, to cause the cloud document component to perform authentication on the first client. After the cloud document component receives the access token, authentication can be performed on the first client with the access token. After the cloud document component confirms that the first client has passed the authentication, the first client, in response to the cloud document component determining that the first client has passed the authentication, a cloud document is loaded in the first client with the cloud document component, wherein the cloud document component loads the cloud document with a first component provided by the first client, the first component providing a capability of rendering a web page. It can be seen that the cloud document component can be implemented at the first client with this solution, so that the cloud document can also be implemented at the first client.

Embodiments of the present application provide a method of data processing based on the cloud document component, which can be executed by the cloud document component. In one example, the cloud document component can receive an access token sent by the first client. Then, the cloud document component perform authentication on the first client with the access token. After determining that the first client has passed the authentication, the cloud document component loads a cloud document with a first component provided by the first client, the first component providing a capability of rendering a web page. It can be seen that with this solution, the cloud document component can load the cloud document with the first component provided by the first client, thereby implementing the cloud document component at the first client, so that the cloud document can also be implemented at the first client.

Embodiments of the present application provide a method of data processing based on cloud document components, which can be executed by the second client. In one example, the cloud document component can send a request to the second client to load the cloud document with the first component provided by the first client. The second client can, in response to the request, obtain the cloud document web page and send the cloud document web page to the cloud document component. It can be seen that with this solution, the cloud document component can implement the purpose of loading the cloud document with the first component provided by the first client, thereby implementing the cloud document component at the first client, so that the cloud document can also be implemented at the first client.

BRIEF DESCRIPTION OF THE DRAWINGS

In order to illustrate the technical solutions in the embodiments or prior art of the present application more clearly, the following will briefly introduce the accompanying drawings that need to be used in the description of the embodiments or prior art. It is obvious that the accompanying drawings in the following description are only some of the embodiments recorded in the present application, and for the person of ordinary skill in the field, other accompanying drawings can be obtained based on these drawings, without putting in any creative labor.

DETAILED DESCRIPTION

In order to enable those in the art to better understand the embodiments of the present application, the technical solutions in the embodiments of the present application will be clearly and completely described below in conjunction with the accompanying drawings in the embodiments of the present application. Obviously, the described embodiments are only a part of the embodiments of the present application, and not all of the embodiments. Based on the embodiments in the present application, all other embodiments obtained by a person of ordinary skill in the art without making creative labor fall within the scope of protection of the present application.

Various non-limiting embodiments of the present application are described in detail below in conjunction with the accompanying drawings.

Figure 1:
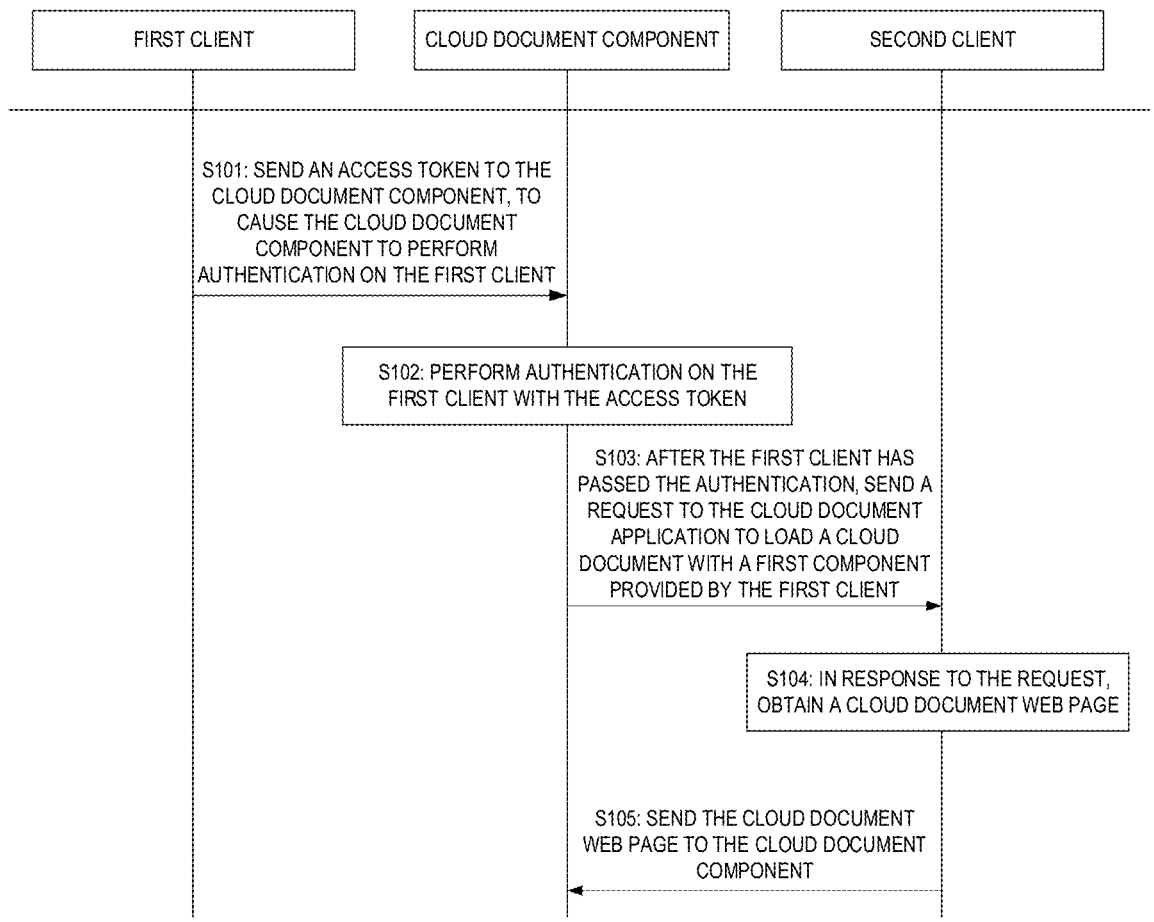
FIG. 1 is a signaling interaction diagram of a method of data processing based on cloud document components provided by embodiments of the present application.

Reference is made to FIG. 1, which is a signaling interaction diagram of a method of data processing based on cloud document components provided by embodiments of the present application. In this embodiment, the method may comprise, for example, the following steps: S101-S105.

Regarding the first client and the second client shown in FIG. 1, it should be noted that the first client may comprise software, applications, or applet applications. The second client may comprise a multi-person collaborative document application, wherein the multi-person collaborative document application may comprise a cloud document application, a shared document application or an online document application.

In one example, the first client may comprise an applet application, and the second client may comprise a cloud document application. For this case, the first client and the second client may be the same client. As an example, the applet application and the cloud document application may be integrated in a certain application. For example, for a target application, mini program functions and cloud document functions can be provided.

At S101, the first client sends an access token to the cloud document component, to cause the cloud document component to perform authentication on the first client.

In embodiments of the present application, the access token refers to a token that can represent authorized identity of the user.

In one example, in addition to sending the access token to the cloud document component, the first client may also send customized configuration information for customizing a function of the cloud document to the cloud document component.

Herein, the functions of cloud documents comprises but not limited to one or more of the following: likes, pictures, sharing, comments, directory, sidebar, full screen button in the lower right corner, the list of collaborators on the right side of the cloud document, the right side of the cloud document more menu and so on.

At S102, the cloud document component performs authentication on the first client with the access token.

After receiving the access token, the cloud document component may perform authentication on the first client with the access token to verify the identity of the first client. Embodiments of the present application do not specifically limit the specific implementation manner in which the cloud document component performs authentication on the first client with the access token.

At S103, after the first client passed the authentication, the cloud document component sends a request to a second client to load the cloud document with a first component provided by the first client.

At S104, in response to the request, the second client obtains the cloud document page.

At S105, the second client sends the cloud document web page to the cloud document component.

In an embodiment of the present application, after the cloud document component determines that the first client has passed the authentication, it indicates that the identity of the first client is legitimate, and therefore the cloud document component can be implemented at the first client. In this case, the first client can load the cloud document with the cloud document component. Herein: when loading the cloud document, the cloud document component can load the cloud document with a first component provided by the first client, which can provide a capability of rendering a web page. Embodiments of the present application do not specifically limit the first component, and in one example, the first component may be a tt-iframe component.

When the cloud document component loads the cloud document with the first component provided by the first client, in specific implementation, the cloud document component may mount the cloud document in the form of the first component to the mounting node of the first client. In one example: the cloud document component can send a request to the second client to load the cloud document with the first component provided by the first client. After receiving the request, the second client can, in response to the request, obtain the cloud document web page. Further, the second client sends the cloud document web page to the cloud document component.

In one example, obtaining the cloud document web page may comprise two stages. The first stage is to obtain a first page comprising HyperText Markup Language (HTML) and send the first page to the cloud document component. The second stage is that after obtaining the first page, a handshake can be performed between the cloud document component and the second client. After the handshake is successful, the second client can further obtain the page content of the cloud document and return it to the cloud document component. The first page and the page content of the cloud document constitute the cloud document page.

Regarding the handshake that can be performed between the cloud document component and the second client, in one example, the second client can send a handshake message to the cloud document component. After receiving the handshake message, the cloud document component can send a response message for the handshake message. At this point, the handshake between the cloud document component and the second client is successful.

After the handshake between the cloud document component and the second client is successful, the cloud document component may send the access token of the first client to the second client. In addition, if the cloud document component receives customized configuration information sent by the first client, the cloud document component can also send the customized configuration information to the second client, so as to subsequently provide the first client with a cloud document meeting its customized configuration.

In addition, the second client can also register an interface to be invoked by the cloud document component, so that the cloud document component subsequently invokes the interface, thereby obtaining the data returned by the interface of the second client, and further returns the data to the first client. In one example, the second client can determine, via the access file of the cloud document formation, that an interface needs to be registered, and further register the interface that needs to be registered.

In one example, the second client can send a Hyper Text Transfer Protocol (HTTP) request to obtain the page content of the cloud document. In one example, the http request can carry access token of the first client. In yet another example, if the second client receives the customized configuration information from the cloud document component, the http request may also comprise the customized configuration information to obtain page content matching the customized configuration information, thus obtaining a cloud document web page matching the customized configuration information.

In one example, the second client can send the first page and the page content of the cloud document to the cloud document component through postMessage. Herein, postMessage provides a cross-domain communication capability for web pages.

As can be seen from the above description, with this solution, the cloud document component can implement the purpose of loading cloud documents with the first component provided by the first client, thereby implementing the cloud document component at the first client, so that the cloud document can also be implemented at the first client.

In one example, the first client can also monitor cloud document events. Embodiments of the present application do not specifically limit the cloud document events. The cloud document events may comprise, for example, events for title changes, events for user permission changes, and so on.

In embodiments of the present application, the cloud document component can provide an interface invoked by the first client, and the second client has also registered an interface for being invoked by the cloud document component. Therefore, the first client can monitor events of the second client. In specific implementation: the cloud document component can invoke the interface on the second client through the interface provided by the first client, thereby obtaining the event data returned by the second client, further, the cloud document component send the event data to the first client with the interface invoked by the first client.

In one example, the second client, when the monitored event is triggered, can send event data to the cloud document component through an interface on the second client and an interface provided by the first client.

Regarding the interface, it should be noted that the interface can provide the capability of cross-domain communication. With the interface, information can be transferred between the two information domains of the cloud document component and the second client. Embodiments of the present application do not specifically limit the interface. In one example, the interface may be a message manager.

In one example, "obtaining, by the first client, event data returned by a second client through an interface provided by the c loud document component to the first client", while in specific implementation, the cloud document component can add the event data to the callback function of the first client, and the callback function is returned to the first client through an interface provided by the cloud document component to the first client.

Based on the method provided by the above embodiments, embodiments of the present application also provide a corresponding apparatus introduced below with reference to the accompanying drawings.

Figure 2:
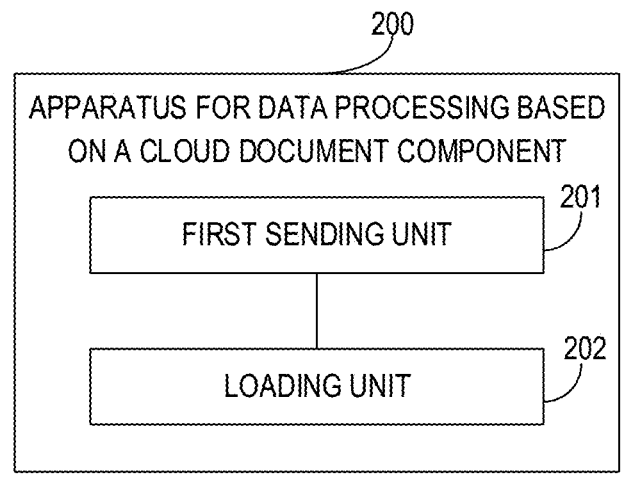
FIG. 2 is a schematic structural diagram of an apparatus for data processing based on cloud document components provided by embodiments of the present application.

Referring to FIG. 2, which is a schematic structural diagram of an apparatus for data processing based on a cloud document component provided by embodiments of the present application. The apparatus 200 can be implemented at the first client and comprises: a first sending unit 201 and a loading unit 202.

The first sending unit 201 is configured to send an access token to the cloud document component, to cause the cloud document component to perform authentication on the first client;

The loading unit 202 is configured to, in response to the cloud document component determining that the first client has passed the authentication, load a cloud document in the first client with the cloud document component, wherein the cloud document component loads the cloud document with a first component provided by the first client, the first component providing a capability of rendering a web page.

Optionally, the apparatus further comprises:
a second sending unit configured to send customized configuration information, for customizing a function of the cloud document, to the cloud document component.

Optionally, the apparatus further comprises:
an obtaining unit configured to obtain event data returned by a second client through an interface provided by the c loud document component to the first client, wherein the cloud document component invokes an interface on the second client through an interface with a cross-domain communication capability and provided by the first client, thereby acquiring the event data returned by the second client.

Optionally, the obtaining unit is configured to:
obtain the event data through a callback function and an interface provided by the cloud document component to the first client.

Since the apparatus 200 is an apparatus corresponding to the method executed by the first client provided by the above method embodiments, the specific implementation of each unit of the apparatus 200 is the same concept as the above method embodiments. Accordingly, for the specific implementation of the various units of the apparatus 200, reference may be made to the relevant portions of the description of the method embodiments above, which will not be repeated herein.

Figure 3:
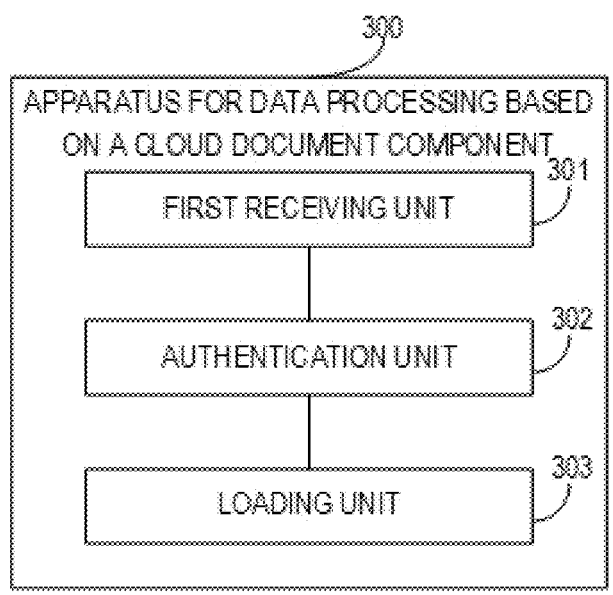
FIG. 3 is a schematic structural diagram of an apparatus for data processing based on cloud document components provided by embodiments of the present application.

Referring to FIG. 3, which is a schematic structural diagram of an apparatus for data processing based on a cloud document component provided by embodiments of the present application. The apparatus 300 shown in FIG. 3 is implemented at the cloud document component. The apparatus 300 comprises: a first receiving unit 301, an authentication unit 302 and a loading unit 303.

The first receiving unit 301 is configured to receive an access token sent by a first client;

The authentication unit 302, configured to perform authentication on the first client with the access token; and The loading unit 303, configured to, after determining that the first client has passed the authentication, load a cloud document with a first component provided by the first client, the first component providing a capability of rendering a web page.

Optionally, the apparatus further comprises:
a second receiving unit configured to receive customized configuration information sent by the first client, the customized configuration information customizing a function of the cloud document.

Optionally, the apparatus further comprises:
a third receiving unit configured to receive a handshake message sent by a second client, and sending a response message to the second client for the handshake message;
a first sending unit configured to send the access token to the second client.

Optionally, in response to receiving, by the cloud document component, customized configuration information sent by the first client, the method further comprises:
a second sending unit configured to send the customized configuration information to the second client.

Optionally, the apparatus further comprises:
an invoking unit configured to invoke an interface on the second client through an interface with a cross-domain communication capability and provided by the first client, thereby acquiring the event data returned by the second client;
a third sending unit configured to send the event data returned by the second client to the first client through an interface provided by the cloud document component to the first client.

Optionally, the third sending unit is configured to:
send the event data returned by the cloud document to the first client through a callback function of the first client for monitoring events and the interface provided by the cloud document component to the first client.

Since the apparatus 300 is an apparatus corresponding to the method executed by the cloud document component provided by the above method embodiments, the specific implementation of each unit of the apparatus 300 is the same concept as the above method embodiments. Accordingly, for the specific implementation of the various units of the apparatus 300, reference is made to the relevant description part of the above method embodiments and will not be repeated here.

Figure 4:
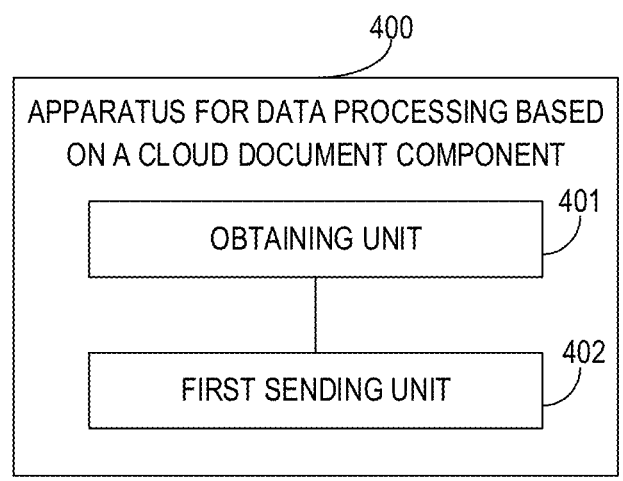
FIG. 4 is a schematic structural diagram of an apparatus for data processing based on cloud document components provided by embodiments of the present application.

Referring to FIG. 4, which is a schematic structural diagram of an apparatus for data processing based on a cloud document component provided by embodiments of the present application. The apparatus 400 shown in FIG. 4 is implemented at the second client. The apparatus 400 comprises: an obtaining unit 401 and a first sending unit 402.

The obtaining unit 401 is configured to obtain a cloud document web page, in response to a request by the cloud document component to load a cloud document with a first component provided by an applet application;

The first sending unit 402 is configured to send the cloud document web page to the cloud document component.

Optionally, the apparatus further comprises:
a second sending unit configured to sending a handshake message to the cloud document component;
a first receiving unit is configured to receive a response message sent by the cloud document component for the handshake message.

Optionally, the apparatus further comprises:
a second receiving unit configured to receive an access token and customized configuration information sent by the cloud document component, the access token causing the cloud document component to perform authentication on the applet application, the customized configuration information customizing a function of the cloud document.

Optionally, the obtaining unit is configured to:
in response to a request by the cloud document component to load a cloud document with a first component provided by an applet application, send a hypertext transfer protocol (HTTP) request carrying the access token and/or the customized configuration information to obtain the cloud document web page.

Optionally, the apparatus further comprises:
a registration unit configured to register an interface to be invoked by the cloud document component.

Optionally, the apparatus further comprises:
a third sending unit configured to, in response to a monitored event being triggered, send event data to the cloud document component through an interface on the second client and an interface provided by the applet application.

Since the apparatus 400 is an apparatus corresponding to the method executed by the second client provided by the above method embodiments, the specific implementation of each unit of the apparatus 400 is the same concept as the above method embodiments. Accordingly, for the specific implementation of the various units of the apparatus 400, reference is made to the relevant description part of the above method embodiments and will not be repeated here.

Embodiments of the present application also provide a device, wherein the device comprises a processor and a memory; and
the processor is configured to execute instructions stored in the memory to cause the device to perform the method executed by the first client, the cloud document component, or the second client.

Embodiments of the present application provide a computer-readable storage medium, comprising instructions which instruct a device to perform the method executed by the first client, the cloud document component, or the second client.

Other embodiments of the present application will be readily apparent to those skilled in the art from consideration of the specification and practice of the invention disclosed herein. This application is intended to cover any variations, uses, or adaptations of the application that follow the general principles of the application and comprise common knowledge or customary technical means in this field that are not disclosed in the present disclosure. The specification and embodiments are to be considered as illustrative only, with the true scope and spirit of the application being indicated by the following claims.

It is to be understood that this application is not limited to the precise structure which has been described above and illustrated in the accompanying drawings, and that various modifications and changes may be made without departing from its scope. The scope of this application is limited only by the appended claims.

The foregoing is only a preferred embodiment of this application and is not intended to limit this application. Any modifications, equivalent substitutions, improvements, etc. made within the spirit and principles of this application shall be included in the scope of protection of this application.

The invention claimed is:

1. A method of data processing based on a cloud document component, wherein the method is implemented at a first client and comprises:
sending an access token to the cloud document component, to cause the cloud document component to perform authentication on the first client;
in response to the cloud document component determining that the first client has passed the authentication, loading a cloud document in the first client with the cloud document component, wherein the cloud document component loads the cloud document with a first component provided by the first client, the first component providing a capability of rendering a web page; and
obtaining, by the first client, event data returned by a second client through an interface provided by the cloud document component to the first client.

2. The method of claim 1, wherein the method further comprises:
sending, by the first client and to the cloud document component, customized configuration information for customizing a function of the cloud document.

3. The method of claim 1,
wherein the cloud document component invokes an interface on the second client through an interface with a cross-domain communication capability and provided by the first client, thereby acquiring the event data returned by the second client.

4. The method of claim 3, wherein obtaining, by the first client, the event data returned by the second client through the interface provided by the cloud document component to the first client comprises:
obtaining, by the first client, the event data through a callback function and the interface provided by the cloud document component to the first client.

5. A method of data processing based on a cloud document component, wherein the method comprises:
receiving, by the cloud document component, an access token sent by a first client;
performing, by the cloud document component, authentication on the first client with the access token;

after determining that the first client has passed the authentication, loading, by the cloud document component, a cloud document with a first component provided by the first client, the first component providing a capability of rendering a web page; and sending, by the cloud document component, event data returned by a second client to the first client through an interface provided by the cloud document component to the first client.

6. The method of claim 5, wherein the method further comprises:

receiving, by the cloud document component, customized configuration information sent by the first client, the customized configuration information customizing a function of the cloud document.

7. The method of claim 5, wherein the method further comprises:

receiving, by the cloud document component, a handshake message sent by the second client, and sending a response message to the second client for the handshake message; and sending, by the cloud document component, the access token to the second client.

8. The method of claim 7, wherein in response to receiving, by the cloud document component, customized configuration information sent by the first client, the method further comprises:

sending, by the cloud document component, the customized configuration information to the second client.

9. The method of claim 5, wherein the method further comprises:

invoking, by the cloud document component, an interface on the second client through an interface with a cross-domain communication capability and provided by the first client, thereby acquiring the event data returned by the second client.

10. The method of claim 9, wherein sending, by the cloud document component, the event data returned by the second client to the first client through the interface provided by the cloud document component to the first client comprises:

sending, by the cloud document component, the event data returned by the cloud document to the first client through a callback function of the first client for monitoring events and the interface provided by the cloud document component to the first client.

11. A method of data processing based on a cloud document component, wherein the method comprises:

obtaining by a second client a cloud document web page, in response to a request by the cloud document component to load a cloud document with a first component provided by an applet application;

sending, by the second client, the cloud document web page to the cloud document component;

registering, by the second client, an interface to be invoked by the cloud document component; and in response to a monitored event being triggered, sending, by the second client, event data to the cloud document component through an interface on the second client and an interface provided by the applet application.

12. The method of claim 11, wherein the method further comprises:

sending, by the second client, a handshake message to the cloud document component; and receiving, by the second client, a response message sent by the cloud document component for the handshake message.

13. The method of claim 11, wherein the method further comprises:

receiving, by the second client, an access token and customized configuration information sent by the cloud document component, the access token causing the cloud document component to perform authentication on the applet application, the customized configuration information customizing a function of the cloud document.

14. The method of claim 13, wherein obtaining the cloud document web page comprises:

sending, by the second client, a hypertext transfer protocol (HTTP) request carrying the access token and/or the customized configuration information to obtain the cloud document web page.

15. An electronic device, wherein the device comprises a processor and a memory; and the processor is configured to execute instructions stored in the memory to cause the device to perform acts comprising:

sending an access token to a cloud document component, to cause the cloud document component to perform authentication on a first client;

in response to the cloud document component determining that the first client has passed the authentication, loading a cloud document in the first client with the cloud document component, wherein the cloud document component loads the cloud document with a first component provided by the first client, the first component providing a capability of rendering a web page; and obtaining, by the first client, event data returned by a second client through an interface provided by the cloud document component to the first client.

16. The device of claim 15, wherein the acts further comprise:

sending, by the first client and to the cloud document component, customized configuration information for customizing a function of the cloud document.

17. The device of claim 15, wherein the cloud document component invokes an interface on the second client through an interface with a cross-domain communication capability and provided by the first client, thereby acquiring the event data returned by the second client.

18. The device of claim 17, wherein obtaining, by the first client, the event data returned by the second client through the interface provided by the cloud document component to the first client comprises:

obtaining, by the first client, the event data through a callback function and the interface provided by the cloud document component to the first client.

* * * * *